United States Patent
Geary et al.

(10) Patent No.: US 10,190,776 B2
(45) Date of Patent: Jan. 29, 2019

(54) FUEL INJECTOR SYSTEM

(71) Applicant: ROLLS-ROYCE plc, London (GB)

(72) Inventors: Alan Geary, Bristol (GB); Keith Bell, Bristol (GB)

(73) Assignee: ROLLS-ROYCE plc, London (GB)

(*) Notice: Subject to any disclaimer, the term of this patent is extended or adjusted under 35 U.S.C. 154(b) by 351 days.

(21) Appl. No.: 15/077,050

(22) Filed: Mar. 22, 2016

(65) Prior Publication Data
US 2016/0298848 A1 Oct. 13, 2016

(30) Foreign Application Priority Data
Apr. 9, 2015 (GB) .................................. 1506017.1

(51) Int. Cl.
F23R 3/28 (2006.01)
F02C 7/22 (2006.01)
F02C 7/28 (2006.01)

(52) U.S. Cl.
CPC .............. F23R 3/286 (2013.01); F02C 7/222 (2013.01); F02C 7/28 (2013.01); F23R 3/283 (2013.01); F23R 2900/00012 (2013.01)

(58) Field of Classification Search
CPC .... F02C 7/20; F02C 7/222; F02C 7/28; F23R 3/14; F23R 3/286; F23R 2900/00012
See application file for complete search history.

(56) References Cited

U.S. PATENT DOCUMENTS

| 4,198,815 A | 4/1980 | Bobo et al. |
| 4,693,074 A | 9/1987 | Pidcock et al. |
| 5,117,624 A * | 6/1992 | Roberts, Jr. ............. F23R 3/283 60/740 |
| 6,543,235 B1 | 4/2003 | Crocker et al. |
| 7,628,019 B2 * | 12/2009 | Tanner ...................... F23C 5/02 239/399 |

(Continued)

FOREIGN PATENT DOCUMENTS

| EP | 1116918 A1 | 7/2001 |
| EP | 1158246 A2 | 11/2001 |

(Continued)

OTHER PUBLICATIONS

Jan. 18, 2018 Search Report issued in French Patent Application No. 1652321.

(Continued)

Primary Examiner — Arun Goyal
(74) Attorney, Agent, or Firm — Oliff PLC

(57) ABSTRACT

A fuel injector system with a fuel feed arm extending inwardly from an outer casing of combustion equipment of a gas turbine engine to a flame tube of the equipment, which ends in an injection nozzle which penetrates a head of the tube to deliver fuel. The system has a swirler arranged coaxially with the nozzle at the head of the tube, including one or more circuits which produce flows of swirling air around the fuel. A seal ring seals the nozzle to the swirler, the nozzle being removably inserted into the ring. The ring has a flange portion, and the swirler has a pair of spaced retention grooves at a front face thereof. Opposite edges of the flange portion slidingly locate in the grooves so it sealingly engages to the front face. The swirler has a spring mechanism which retains the flange portion in the grooves.

15 Claims, 3 Drawing Sheets

(56) References Cited

U.S. PATENT DOCUMENTS

| | | |
|---|---|---|
| 8,443,609 B2 | 5/2013 | Doerr et al. |
| 9,188,064 B2 * | 11/2015 | Bunel .................... F23R 3/002 |
| 2009/0049840 A1 | 2/2009 | Cayre et al. |
| 2010/0058765 A1 | 3/2010 | Duval et al. |

FOREIGN PATENT DOCUMENTS

| | | | |
|---|---|---|---|
| EP | 1508743 | A2 | 2/2005 |
| FR | 2963061 | A1 | 1/2012 |
| FR | 2964177 | A1 | 3/2012 |
| WO | 2015/017002 | A2 | 2/2015 |

OTHER PUBLICATIONS

Nov. 4, 2015 Search Report issued in British Patent Application No. 1506017.1.

* cited by examiner

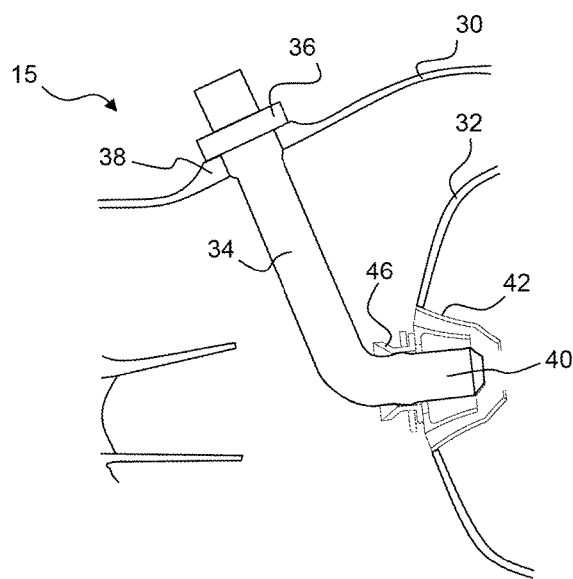
Fig. 3
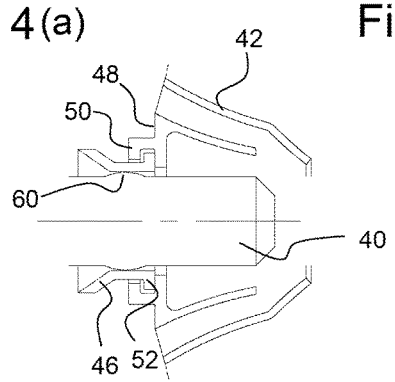 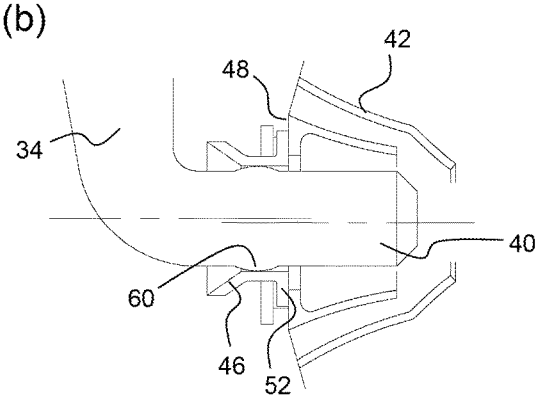

FUEL INJECTOR SYSTEM

FIELD OF THE INVENTION

The present invention relates to a fuel injector system e.g. for combustion equipment of a gas turbine engine.

BACKGROUND OF THE INVENTION

Airspray fuel injectors are commonly used in gas turbine engines. Such injectors use compressor discharge air to create a finely atomised fuel spray. The fuel nozzle of the injector typically has two or three air swirler circuits: an inner, an outer and a dome. An annular fuel passage between the inner and outer air circuits feeds air onto a prefilming lip. This forms a sheet of fuel that breaks down into ligaments, which are then broken up into droplets within shear layers of the surrounding highly swirling air.

FIG. 1 shows schematically conventional combustion equipment of a gas turbine engine. The annular combustion equipment 100 comprises outer 102 and inner 104 air casings, a flame tube 106, and a plurality of circumferentially distributed airspray fuel injectors 108.

Each fuel injector has a feed arm 110 which extends inwardly from an integral mounting flange 112 attached to the inner surface of a boss 114 formed in the outer casing. The feed arm ends in an injection nozzle 116 which penetrates a head of the flame tube 106. The nozzle includes a fuel passage(s) and air swirler circuits.

To provide an air seal at the point of entry of the injection nozzle 116 to the flame tube 106, the outer diameter of the nozzle is a close fit within a seal ring 118, known as a "miniflare". Each miniflare is attached to the flame tube in such a way that it can move tangentially and radially relative to the combustion chamber, to allow for tolerances and differential thermal growths.

If the feed arm 110 were externally mounted to the outer casing 102, it would be necessary to admit the nozzle 116 through the casing. This would require a larger boss 114 to accommodate an aperture that could accept the passage of the nozzle, and hence would impose a weight penalty. Mounting the feed arm 110 internally to the outer casing 102 helps to avoid the weight penalty of a larger boss, but at the cost of more complex machining at the mounting flange-to-casing interface. Further, it precludes the replacement of a defective fuel injector without significant engine strip-down.

SUMMARY OF THE INVENTION

An aim of the present invention is to provide an improved fuel injector system.

A first aspect of the present invention provides a fuel injector system having:
- a fuel feed arm which, in use, extends inwardly from an outer casing of combustion equipment of a gas turbine engine to a flame tube of the combustion equipment, the feed arm ending in an injection nozzle which penetrates a head of the flame tube to deliver fuel into the tube;
- a swirler which, in use, is arranged coaxially with the injection nozzle at the head of the flame tube, the swirler having one or more air swirler circuits which produce respective flows of swirling air around the fuel delivered by the injection nozzle; and
- a seal ring which seals the injection nozzle to the swirler, the injection nozzle being removably inserted into the seal ring for sealing engagement therewith;
- wherein the seal ring has a flange portion, and the swirler has a pair of spaced retention grooves at a front face thereof, opposite edges of the flange portion slidingly locating in the grooves such that the flange portion sealingly engages to the front face; and
- wherein the swirler has a spring mechanism which retains the flange portion in the grooves.

As the injection nozzle is removably inserted into the seal ring, it can be readily dismounted from the flame tube, leaving the swirler in position at the head of the flame tube, and the seal ring retained by the retention grooves. The diameter of the injection nozzle can thus be reduced relative to that of the conventional fuel injector discussed above in relation to FIG. 1. This allows the feed arm to be externally mounted to the outer casing without incurring the weight penalty of a large boss on the outer casing. External mounting in turn facilitates replacement of defective injectors.

A second aspect of the present invention provides combustion equipment of a gas turbine engine, the equipment having:
- an outer casing;
- a flame tube inwardly of the outer casing; and
- one or more fuel injector systems according to the first aspect.

A third aspect of the present invention provides a gas turbine engine having the combustion equipment of the second aspect.

Optional features of the invention will now be set out. These are applicable singly or in any combination with any aspect of the invention.

The flange portion may be at the downstream end of the seal ring. With such an arrangement, the seal ring thus does not have to pass through the swirler.

Conveniently, the injection nozzle can be removably inserted into the seal ring by a push-fit operation.

The injection nozzle may have an outer surface which increases in diameter for sealing engagement with the seal ring. Such a diameter increase can improve contact with the seal ring and thereby improve the sealing engagement. It can also mitigate adverse effects caused by misalignment of the axes of the injection nozzle and the seal ring. The outer surface can be provided, for example, by a circumferential bulge. Such a bulge can have an outer surface to form a spherical interface with the seal ring.

Conveniently, the grooves may be substantially aligned with the radial direction of the engine, such that the seal ring can be slid radially inwardly to fit the seal ring to the swirler and slid radially outwardly to remove the seal ring from the swirler.

The swirler may have a bore through which the injection nozzle passes, the seal ring being aligned with the bore. The bore may allow for relative radial movement between the injection nozzle and the swirler. For example, the bore may be race-track shaped, with the long axis of the race-track aligned radially.

The grooves may be formed by respective lipped rails at the front face of the swirler.

The spring mechanism can include a cantilever spring that is shaped such that it is initially urged outwardly by the seal ring as the flange portion slides along the grooves, and such that it subsequently resiles inwardly to retain the flange portion in the grooves when the flange portion slides further along the grooves. For example, when the grooves are formed by respective lipped rails, conveniently one of the lipped rails may provide the cantilever spring.

The opposite edges of the flange portion may be formed as flats which cooperate with the grooves to prevent rotation of the seal ring.

The upstream end of the seal ring may be flared to provide a lead-in for insertion of the injection nozzle.

The swirler may be integrally formed with the head of the flame tube.

The swirler may be formed by additive layer manufacturing, such as by direct laser deposition.

The fuel feed arm may have an integral mounting flange at the opposite end from the injection nozzle, the mounting flange being configured for attachment to an external surface of the outer casing of the combustion equipment.

BRIEF DESCRIPTION OF THE DRAWINGS

Embodiments of the invention will now be described by way of example with reference to the accompanying drawings in which:

FIG. 3 shows schematically combustion equipment of the gas turbine engine of FIG. 2;

FIG. 4(a) and FIG. 4(b) show more detailed views of a fuel injector nozzle and swirler of the combustion equipment of FIG. 3(a) on a tangential section, and (b) on a radial section.

DETAILED DESCRIPTION AND FURTHER OPTIONAL FEATURES OF THE INVENTION

Figure 1:
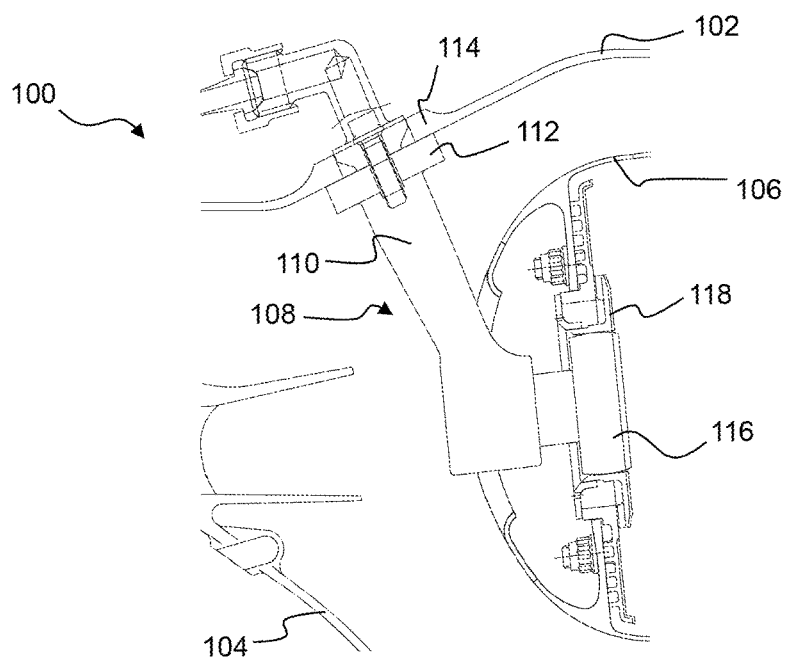
FIG. 1 shows schematically conventional combustion equipment of a gas turbine engine
Figure 2:
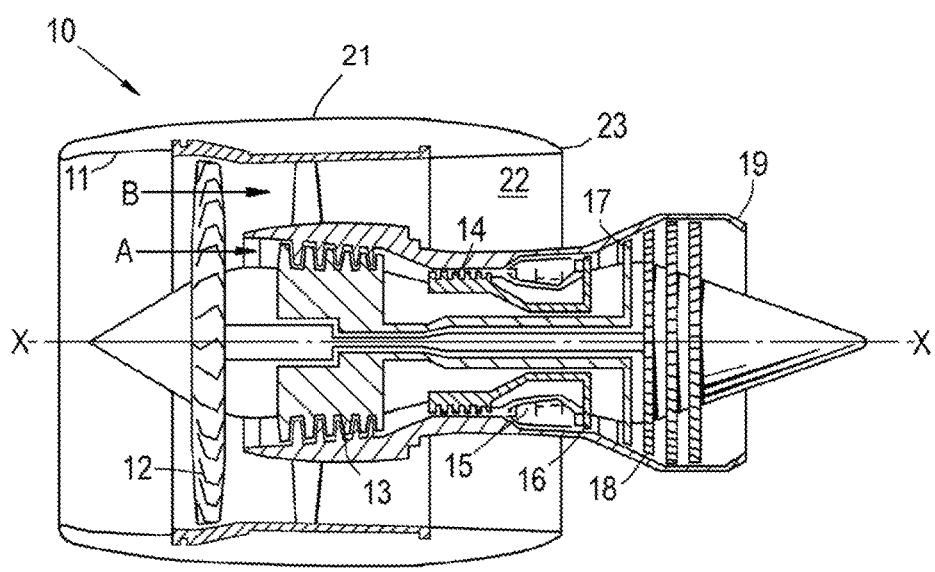
FIG. 2 shows a longitudinal cross-section through a ducted fan gas turbine engine.

With reference to FIG. 2, a ducted fan gas turbine engine incorporating the invention is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate-pressure compressor 13 and a second air flow B which passes through the bypass duct 22 to provide propulsive thrust. The intermediate-pressure compressor 13 compresses the air flow A directed into it before delivering that air to the high-pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate-pressure compressors 14, 13 and the fan 12 by suitable interconnecting shafts.

FIG. 3 shows schematically the combustion equipment 15 of the gas turbine engine 10 of FIG. 2, the equipment being fitted with plural circumferentially distributed fuel injector systems of the present invention.

The annular combustion equipment 15 has outer 30 and inner casings and a flame tube 32. Each fuel injector system includes an injector comprising a fuel feed arm 34 and an injection nozzle 40 at an inward end of the feed arm. The feed arm 34 extends inwardly from an integral mounting flange 36 attached to the outer surface of a boss 38 formed in the outer casing, and the nozzle 40 penetrates the head of the flame tube. In use, fuel flows through the feed arm to be delivered into the flame tube by the nozzle.

A swirler 42 surrounds the nozzle 40 and provides one or more coaxial air swirler circuits. Swirling air flows from these circuits atomise the fuel delivered by the nozzle. Conveniently, the swirler 42 can be integral with the head of the flame tube 32

Figure 5:
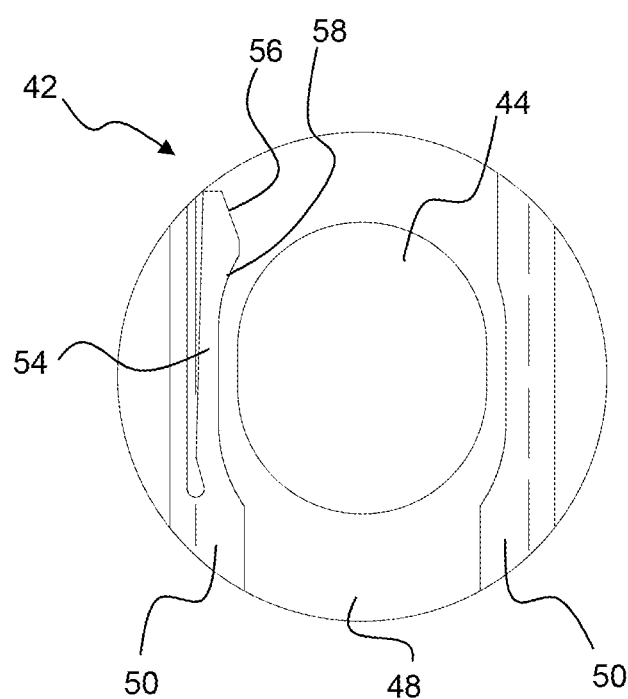
FIG. 5 shows a view of the front face of the swirler.

FIG. 4(a) shows more detailed views of the nozzle 40 and swirler 42 on a tangential section, and FIG. 4(b) on a radial section, and FIG. 5 shows a view of the front face of the swirler.

The swirler 42 has a central bore 44 through which the nozzle 40 passes into head of the flame tube 32. The bore is race-track shaped, with the long axis of the race-track aligned radially, to allow relative radial movement between the swirler and nozzle. A floating seal ring 46 seals the nozzle to the swirler 42.

The front face 48 of the swirler is flat except for two lipped rails 50 which are orientated substantially parallel to the radial direction. The seal ring 46 has a flange 52 at its downstream end, opposite edges of the flange slidingly locate in respective grooves formed by the lipped rails 50. Thus, the seal ring 46 can be slid radially inwardly to fit the ring to the swirler, and slid radially outwardly to remove the ring from the swirler. The edges of the flange 52 received in the grooves are formed as flats which cooperate with the rails to provide an anti-rotation function. The rails 50 are profiled to retain the seal ring 46 and to accommodate tolerances and relative thermal movements in the radial direction.

The flat front face 48 of the swirler and the adjoining flat face of the flange 52 of the seal ring 46 form a seal, being forced into mutual contact by the pressure drop across the flame tube 32 during engine operation. This can avoid a need for a separate sealing device.

The lip of one of the rails 50 is slotted to provide a cantilever spring 54 which retains the flange 52 in the grooves. The slot root radius is sized to prevent it acting as site for crack initiation. The spring 54 has lead-in 56 and lead-out 58 chamfers to facilitate seal ring fitting and removal. More particularly, the seal ring 46 is fitted by locating its flange 52 under the rails 50. Pushing the seal ring radially inwardly leads to contact with the spring lead-in chamfer 56. This action deflects the spring (to the left in FIG. 5), allowing the seal ring to pass and sit approximately centrally on the swirler face, the spring resiling to its undeflected shape to retain the seal ring. Removal of the seal is the reverse of this procedure, with the seal ring being pushed radially outwardly to contact with the spring "lead-out" chamfer 58.

The nozzle 40 is sealingly engaged to the seal ring 46 by push-fitting the nozzle through the centre of the ring. To facilitate this procedure, the upstream end of the seal ring is flared to provide a lead-in for the nozzle and help to ensure alignment of the nozzle 40 and swirler 42 during build. The nozzle can have a circumferential bulge 60 on its outer surface to improve contact with the seal ring and thereby improve the seal. In particular, the bulge can provide a spherical interface with the bore 44 of the seal ring 46, mitigating adverse effects, such as jamming, which can be caused by misalignment of the axes of the bore and the nozzle.

The retention function provided by lipped rails 50 is only required during engine or module build and strip, the seal ring 46 being retained by the feed arm 34 and nozzle 40 after assembly. Advantageously, however, as the nozzle can be readily removed from the seal ring by reversing the push-fitting operation, it can readily be dismounted from the flame tube 32, leaving the swirler 42 in position at the head of the flame tube, and the seal ring retained by the lipped rails 50. The diameter of the nozzle can thus be reduced relative to a nozzle which has an integral swirler. This in turn facilitates replacement of defective injectors by enabling the external mounting of the feed arm 34 to the outer casing 30. In particular, the boss 38 on the outer casing 30 does not have to be over-sized in order to accommodate a large aperture, and therefore does not impose a large weight penalty.

The swirler 42 has a relatively complex geometry due to the presence of vanes in its air swirler circuits. Conveniently, it can be formed by additive layer manufacture, such as by direct laser deposition, e.g. being built up from the front face 48.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A fuel injector system having:
   a fuel feed arm which, in use, extends inwardly from an outer casing of combustion equipment of a gas turbine engine to a flame tube of the combustion equipment, the fuel feed arm ending in an injection nozzle which penetrates a head of the flame tube to deliver fuel into the flame tube;
   a swirler which, in use, is arranged coaxially with the injection nozzle at the head of the flame tube, the swirler having one or more air swirler circuits which produce respective flows of swirling air around the fuel delivered by the nozzle; and
   a seal ring which seals the injection nozzle to the swirler, the injection nozzle being removably inserted into the seal ring for sealing engagement therewith;
   wherein the seal ring has a flange portion , and the swirler has a pair of spaced retention grooves at a front face thereof, opposite edges of the flange portion slidingly locating in the grooves such that the flange portion sealingly engages to the front face,
   wherein the swirler has a spring mechanism which retains the flange portion in the grooves,
   wherein the grooves extend along a direction parallel to a radial direction of the engine, such that the seal ring can be slid radially inwardly to fit the seal ring to the swirler and slid radially outwardly to remove the seal ring from the swirler, and
   wherein the grooves are formed by respective lipped rails at the front face of the swirler, the lipped rails being attached to the swirler, the grooves defined between the respective lipped rails and the front face of the swirler.

2. A fuel injector system according to claim 1, wherein the flange portion is at a downstream end of the seal ring.

3. A fuel injector system according to claim 1, wherein the injection nozzle has an outer surface which increases in diameter for sealing engagement with the seal ring.

4. A fuel injector system according to claim 1, wherein the spring mechanism includes a cantilever spring that is shaped such that it is initially urged outwardly by the seal ring as the flange portion slides along the grooves, and such that it subsequently resiles inwardly to retain the flange portion in the grooves when the flange portion slides further along the grooves.

5. A fuel injector system according to claim 4, wherein the lipped rails provides the cantilever spring.

6. A fuel injector system according to claim 1, wherein the opposite edges of the flange portion are formed as flats which cooperate with the grooves to prevent rotation of the seal ring.

7. A fuel injector system according to claim 1, wherein an upstream end of the seal ring is flared to provide a lead-in for insertion of the injection nozzle.

8. A fuel injector system according to claim 1, wherein the swirler is integrally formed with the head of the flame tube.

9. A fuel injector system according to claim 1, wherein the swirler is formed by additive layer manufacturing.

10. A fuel injector system according to claim 1, wherein the fuel feed arm has an integral mounting flange at an opposite end from the injection nozzle, the mounting flange being configured for attachment to an external surface of the outer casing of the combustion equipment.

11. Combustion equipment of a gas turbine engine, the equipment having:
    the outer casing;
    the flame tube inwardly of the outer casing; and
    one or more fuel injector systems according to claim 1.

12. A gas turbine engine having the combustion equipment of claim 11.

13. A fuel injector system according to claim 1, wherein the swirler has a bore, and the bore of the swirler is race-track shaped and has a long axis, the long axis of the race-track being arranged radially to allow relative radial movement between the swirler and the nozzle.

14. A fuel injector system having:
    a fuel feed arm which, in use, extends inwardly from an outer casing of combustion equipment of a gas turbine engine to a flame tube of the combustion equipment, the fuel feed arm ending in an injection nozzle which penetrates a head of the flame tube to deliver fuel into the flame tube;
    a swirler which, in use, is arranged coaxially with the injection nozzle at the head of the flame tube, the swirler having one or more air swirler circuits which produce respective flows of swirling air around the fuel delivered by the nozzle; and
    a seal ring which seals the injection nozzle to the swirler, the injection nozzle being removably inserted into the seal ring for sealing engagement therewith,
    wherein the seal ring has a flange portion, and the swirler has a pair of spaced retention grooves at a front face thereof, opposite edges of the flange portion slidingly locating in the grooves such that the flange portion sealingly engages to the front face,
    wherein the swirler has a spring mechanism which retains the flange portion in the grooves,
    wherein the grooves are formed by respective lipped rails at the front face of the swirler, the lipped rails being attached to the swirler, the grooves defined between the respective lipped rails and the front face of the swirler, and wherein the lipped rails are substantially parallel to a radial direction of the engine.

15. A fuel injector system according to claim 14, wherein the grooves extend along a direction parallel to the radial direction of the engine, such that the seal ring can be slid radially inwardly to fit the seal ring to the swirler and slid radially outwardly to remove the seal ring from the swirler.

\* \* \* \* \*